US009491079B2

(12) United States Patent
Dupre et al.

(10) Patent No.: US 9,491,079 B2
(45) Date of Patent: *Nov. 8, 2016

(54) REMOTE MONITORING AND CONTROLLING OF NETWORK UTILIZATION

(71) Applicant: Cisco Technology, Inc., San Jose, CA (US)

(72) Inventors: Anthony Dupre, Portland, OR (US);
Landon Gentry, West Linn, OR (US);
Steve Gorretta, Portland, OR (US);
Alan Jeddeloh, Portland, OR (US);
Zachary Pitts, Beaverton, OR (US);
David Rostron, Portland, OR (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/944,965

(22) Filed: Nov. 18, 2015

(65) Prior Publication Data

US 2016/0080232 A1    Mar. 17, 2016

Related U.S. Application Data

(63) Continuation of application No. 14/625,393, filed on Feb. 18, 2015, now Pat. No. 9,253,066, which is a continuation of application No. 13/712,617, filed on Dec. 12, 2012, now Pat. No. 8,990,390.

(60) Provisional application No. 61/569,673, filed on Dec. 12, 2011.

(51) Int. Cl.
| | |
|---|---|
| *G06F 15/16* | (2006.01) |
| *H04L 12/26* | (2006.01) |
| *H04L 12/24* | (2006.01) |
| *H04L 12/851* | (2013.01) |

(52) U.S. Cl.
CPC ....... *H04L 43/0876* (2013.01); *H04L 41/0896* (2013.01); *H04L 43/10* (2013.01); *H04L 47/24* (2013.01); *H04L 43/022* (2013.01)

(58) Field of Classification Search
CPC .................................................. H04L 41/0873
USPC ......................................................... 709/224
See application file for complete search history.

(56) References Cited

U.S. PATENT DOCUMENTS

| | | |
|---|---|---|
| 5,537,417 A | 7/1996 | Sharma et al. |
| 5,838,919 A | 11/1998 | Schwaller et al. |

(Continued)

OTHER PUBLICATIONS

U.S. Appl. No. 14/625,393, filed Feb. 18, 2015, Notice of Allowance, Sep. 9, 2015.

*Primary Examiner* — Hamza Algibhah
(74) *Attorney, Agent, or Firm* — Hickman Palermo Becker Bingham LLP; Malgorzata A. Kulczycka

(57) ABSTRACT

A non-transitory computer-readable storage medium storing instructions which, when executed by processors, cause the processors to perform: at a management computer, receiving, from a gateway located in a managed network, device information about devices in the managed network; for a particular device: determining a match between the device capabilities of the particular device and features of a particular network software application configured to control the particular device, and determining a particular protocol endpoint configured to communicate control instructions from the particular network software application to the particular device; receiving, from the gateway, aggregated data that reflects network utilization by the devices located in the managed network; for the particular device: based at least in part on the aggregated data, using the particular network software application, determining control instructions for the particular device; causing the particular protocol endpoint to transmit the control instructions for the particular device to the device.

20 Claims, 5 Drawing Sheets

(56) References Cited

U.S. PATENT DOCUMENTS

| | | |
|---|---|---|
| 5,881,237 A | 3/1999 | Schwaller et al. |
| 5,937,165 A | 8/1999 | Schwaller et al. |
| 7,433,943 B1 | 10/2008 | Ford |
| 7,631,109 B2* | 12/2009 | Roellgen .................... 710/8 |
| 7,822,835 B2* | 10/2010 | Atkinson et al. ............ 709/221 |
| 7,827,261 B1* | 11/2010 | Griswold, Jr. ......... G06F 15/16 709/223 |
| 8,060,633 B2 | 11/2011 | Zhang et al. |
| 8,990,390 B2 | 3/2015 | Dupre et al. |
| 2003/0135596 A1* | 7/2003 | Moyer et al. .............. 709/223 |
| 2004/0249907 A1* | 12/2004 | Brubacher et al. ......... 709/220 |
| 2006/0173979 A1* | 8/2006 | Roellgen ................... 709/221 |
| 2010/0115581 A1* | 5/2010 | Goldschlag et al. ......... 726/1 |
| 2010/0232305 A1* | 9/2010 | Shichino ................... 370/252 |
| 2012/0072545 A1* | 3/2012 | Lee, II ............... H04L 41/0803 709/219 |
| 2013/0191524 A1 | 7/2013 | Dupre et al. |
| 2013/0205016 A1 | 8/2013 | Dupre et al. |
| 2015/0163119 A1 | 6/2015 | Dupre et al. |

* cited by examiner

REMOTE MONITORING AND CONTROLLING OF NETWORK UTILIZATION

BENEFIT CLAIM

This application claims the benefit under 35 U.S.C. §120 as a continuation of application Ser. No. 14/625,393, filed Feb. 18, 2015, which is a continuation of U.S. Pat. No. 8,990,390 B2, issued on Mar. 24, 2015, which claims the benefit under 35 U.S.C. 119(e) of provisional application 61/569,673, filed Dec. 12, 2011, the entire contents of which are hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

CROSS-REFERENCE TO RELATED APPLICATIONS

This application is related to U.S. Pat. No. 9,015,306 B2, granted Apr. 21, 2015, titled "Mapping Protocol Endpoints to Networked Devices and Applications Based on Capabilities," the entire contents of which is hereby incorporated by reference as if fully set forth herein.

FIELD OF THE INVENTION

The present disclosure relates generally to methods for remote monitoring and controlling of network utilization in computer networks.

BACKGROUND

Problems with remote monitoring and managing of third-party devices in local area networks are usually caused by the difficulties in establishing communications between a remote managing entity and the third-party devices. For example, establishing communications with the third-party devices in the local area networks may be difficult because the devices may implement a variety of communications protocols and interfaces. In particular, it may be difficult to develop a management application configured to facilitate communications with a vast quantity of heterogeneous third-party devices, each of which may implement a different protocol or interface. The difficulties in developing such an application may cause problems in configuring the remote managing entity to be able to access and to remotely manage the devices.

Furthermore, it may be difficult for a remote managing entity to determine configurations of third-party devices in local area networks and collect network utilization information from the devices. For example, a remote managing entity may be unable to access the data indicating the types and identities of devices configured in the network. Even if various tools designed to discover the devices in a network are used, the tools may be helpful in discovering the devices in the network to which the remote managing entity belongs, not the devices in a separate local area network. Hence, the remote managing entity may be unable to even determine the configuration of the local area network, much less to collect network utilization information from each device.

However, as the complexity of computer networks increases, the ability to remotely monitor and manage devices in local area networks becomes more and more desirable. Often a user in a local area network is unable to manage the network himself, and may ask for some assistance from help desk operators from a service provider company. While the operators of the service provider company are willing to help, they may be unable to solve the user's problems if they cannot determine the configuration of the local area network or obtain network utilization information from the user's devices.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF THE INVENTION

The appended claims may serve as a summary of the invention.

DESCRIPTION OF EXAMPLE EMBODIMENTS

Figure 1:
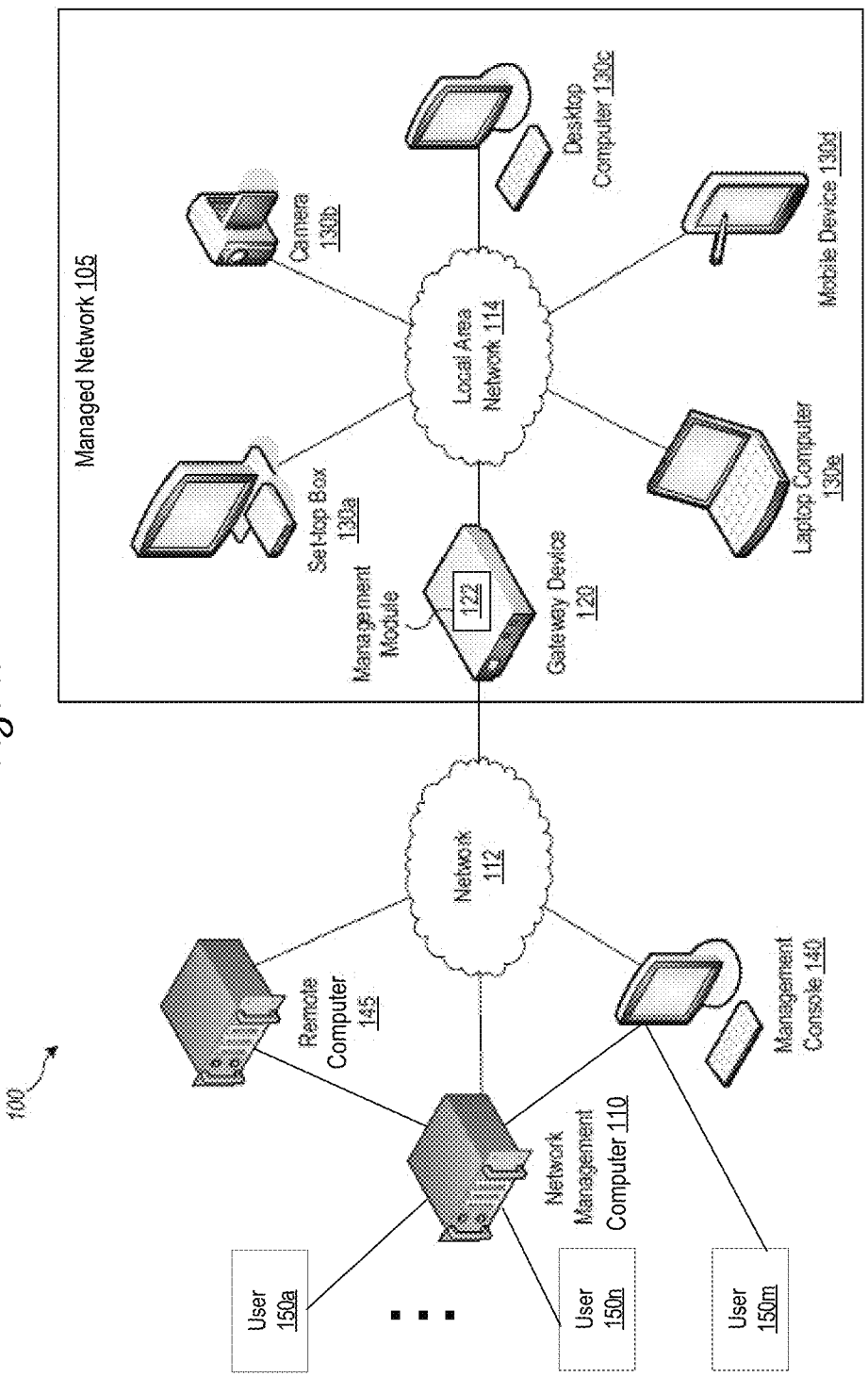
FIG. 1 illustrates an example network management environment for remote monitoring and controlling of network utilization in a computer network.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview

Embodiments described herein provide methods for remote monitoring and management of network utilization in a managed network. The methods implement a separation between software applications, which generate control instructions for managing the network utilization by devices in the managed network, and protocol endpoints, which communicate the generated control instructions to the devices.

In an embodiment, at least a description of the capabilities of managed devices in the managed network is used to determine one or more network software applications that have the capabilities to generate control instructions for the managed devices. Further, at least the description of the capabilities of the managed devices is used to determine one or more network software applications that have the capabilities to communicate the control instructions to the managed devices using a communications protocol that the managed devices implement. For a particular device in the managed network, the information about the determined software applications, the information about the determined protocol endpoints and an identification of the particular device is stored in an association mapping. The association mapping is used by a management computer to determine a particular software application that is configured to generate control instructions for the particular device, and to determine a particular protocol endpoint that is configured to transmit the control instructions to the particular device.

In one embodiment, a method may be implemented in a Network Management Environment ("NME") comprising a network management computer configured to remotely monitor and control network utilization in one or more managed networks. A management computer may be referred to as an Auto-Configuration Server ("ACS") and may be part of any type of network such as a service provider network, a data content delivery network, or other network providing services to users, consumers or customers. For example, a management computer may be part of an Internet Service Provider (ISP) network and provide services to local area networks. According to another example, a management computer may be part of a Content Delivery Network (CDN) and provide services to users and customers of the CDN.

In an embodiment, a management computer is configured in a network that is separate from the managed networks. For example, a management computer may be configured in an ISP network that is separate from a residential local area network that the management computer manages.

In an embodiment, a managed network comprises a plurality of devices such as personal computers, laptop computers, set-top boxes, digital video recorders, video cameras, security cameras, Wii boxes, smart phones, tablets, game consoles, multi-functional peripheral (MFP) devices, home appliances, and home automation systems.

A management computer may be configured to interact with devices in one or more managed networks and remotely manage the networks. For example, a management computer may be configured to regulate network utilization by devices in a local area network. The management computer may restrict, limit, or otherwise regulate the amount of bandwidth that a particular device or a group of devices in the local area network may use.

In an embodiment, a management computer receives device-specific information from devices in a managed network or from a gateway in the managed network. Device-specific information may comprise various data, including device capabilities of the computing devices. For example, the device-specific information of a particular device may include information about the identity of the particular device, the device type or class information, the manufacturer information, the device functionality information, the device configuration, the communications protocols implemented on the particular devices, the identifiers of the ports implemented on the particular device, and the like.

In an embodiment, a management computer matches the capabilities of devices in a managed network with the capabilities of network software applications implemented in a management computer. For example, for each device, for which device-specific information was received, the management computer may determine one or more matches between the device capabilities of the device and the capabilities of network software applications implemented in the management computer. The capabilities of network software applications may be determined ahead of time and stored in a capabilities mapping, described in the next section.

The purpose of determining matches for a particular device is to find one or more software applications that have the capabilities to control the particular device. In particular, the purpose of determining the matches for the particular device is to find one or more software applications that have the capabilities to generate control instructions, which when executed on the particular device, would regulate network utilization by the particular device.

A network software application is an application that is configured to manage certain functionalities of a device. For example, a bandwidth restricting application may be configured to manage a smart phone device that has the capabilities to download content from a content provider network. In this example, a description of the content downloading capabilities of the smart phone device may be compared with a description of the capabilities of the bandwidth restricting application to determine whether a match between the capabilities of the smart phone and the capabilities of the bandwidth restricting application exists.

In an embodiment, based at least in part on device-specific information for a particular device, one or more protocol endpoints configured to communicate control instructions from a particular network software application to the particular device is determined.

A protocol endpoint application is an application that is configured to communicate control instructions to a particular device or a particular group of devices. For example, a particular protocol endpoint may be an application configured to establish a TCP connection between devices, communicate data segments using the TCP connection, and close the TCP connection between the devices. Hence, the TCP protocol endpoint may be configured to communicate the control instructions to a device that has the capabilities to establish a TCP connection, communicate data segments using the TCP connection and close the TCP connection. If the device-specific information for a particular device indicates that the particular device implements TCP, then by comparing the device-specific information for the particular device with a description of the capability of the TCP protocol endpoint, a management program may identify the TCP protocol endpoint as suitable for communicating the control instructions from the management computer to the particular device.

Once a management computer determines a particular network software application that is configured to generate control instructions for a particular device, and a particular endpoint configured to transmit the control instructions to the particular device, the management computer may create and store an association mapping. An association mapping is a mapping between the particular software application, the particular endpoint and the particular device is stored in an association mapping.

An association mapping (or just a mapping) for a particular network device reflects an association between a particular network software application, configured with the features for monitoring and managing the particular device, a particular protocol endpoint for communicating with the particular device, and the particular device. For example, if a particular computing device is a wireless device, and the particular wireless device has the capabilities to download and play video games, then a network management computer may create and store an association mapping between a particular game-distribution application, a particular protocol endpoint configured to deliver games to the particular wireless device, and for example, an identifier of the particular wireless device. The particular game-distribution application may be configured to receive requests and to download the games. The particular protocol endpoint may be configured to send requests from the wireless device to the particular game-distribution application, and send game contents from the particular game-distribution application (or a website or other sources) to the wireless device. The association mapping may be stored in a data center, cloud data storage or any other storage facility. The association mapping may be retrieved each time a user of the wireless device requests downloading a video game, and each time the network management computer downloads a video game to the wireless device.

In an embodiment, a network management computer receives, from a network gateway device, aggregated data that reflects network utilization by each of a plurality of devices located in the managed network.

In an embodiment, based at least in part on the aggregated data, and using an association mapping, a management computer determines, for a particular computing device, a particular network software application that has the capabilities to generate control instructions for the particular computing device. Once the particular network software application is determined, the management computer invokes the particular network software application to allow the particular application to generate control instructions for the particular device.

Further, using an association mapping, a managing computer determines, for a particular computing device, a particular protocol endpoint application that has the capabilities to transmit the control instructions to the particular computing device. Once the particular protocol endpoint application is determined, the management application causes the particular protocol endpoint to transmit the control instructions for the particular computing device to the network gateway device.

In an embodiment, a network gateway device receives, from a management computer, control instructions for one or more devices from a plurality of devices in a managed network. The control instructions may comprise requests directed either to the gateway or to the devices. For example, the control instructions may comprise a request to prioritize network utilization by each of the devices in the managed network. In response to determining that the control instructions comprise a request to prioritize network utilization by each of the devices, the network gateway device may assign a network utilization priority level to each of the devices, and restrict the network utilization of the devices based on the assigned network utilization priority levels.

In an embodiment, in response to determining that the instructions comprise a request to restrict network utilization by a device of the plurality of devices during a particular time interval, the network gateway device restricts the network utilization by the device during the particular time interval.

In an embodiment, in response to determining that the instructions comprise a request to restrict a particular traffic type sent to or received from a device of the plurality of devices, the network gateway device restricts the particular traffic type that is sent to or received from the device.

In an embodiment, in response to determining that the instructions comprise a request to regulate network utilization of a device of the plurality of devices within a particular time interval, the network gateway device adjusts the network utilization by the device within the particular time interval.

In an embodiment, in response to determining that the instructions comprise a request for additional information about devices in the managed network, the network gateway device collects information about the network transmissions performed by the devices, determines statistical information reflecting network utilization by the devices, aggregates the information and transmits the information to the management computer.

In an embodiment, a management computer (or a network gateway device) is also configured to receive and display information specific to network utilization by devices in a managed network. The displayed information may reflect various aspects of bandwidth utilization by the devices, such as network utilization of each of the devices, aggregated network utilization of the devices, statistical information, graphs, charts, warning, errors, and the like.

In an embodiment, the method is performed by one or more computing devices.

Example Embodiments of a Management Computer and a Managed Network

A management computer may be configured to regulate network utilization in a managed network. For example, a management computer may request assigning a priority scheme to devices in a local area network. By assigning the priorities to the devices, the management computer may give preferential treatment to some devices in terms of network utilization. For example, when a user of a particular device tries to establish a VoIP connection with another device, the management computer may assign a relatively high priority to the particular device and enable the particular device to deliver a VoIP signal that satisfies a certain level of quality of service. Priorities may be expressed or specified in various ways, including a priority scale (low priority, medium priority, high priority), a color coding (green, yellow, red), a numerical scale (1-5), or any other priority scheme.

A management computer may also be configured to execute a workflow computer program supporting communications with devices installed in managed networks. A workflow computer program may be configured to manage synchronous or asynchronous state transitions between multiple components of the management computer. The workflow computer program may also be configured to handle communications with third-party devices in the managed networks, and manage HTTP request-response communications with the devices.

A managed network may be any type of a network that is remotely managed by a management computer. Examples of managed networks include local area networks, residential networks, home networks, customer networks, consumer networks, Wi-Fi networks, or any other local area networks that are separate from the management computer. For purposes of illustrating clear examples, in an embodiment, the managed networks may be called customer networks because, from the perspective of a service provider, the managed networks are owned or operated by customers of the service provider. However, the term customer is merely used herein as a convenient label. In an embodiment, a managed network may be any type of a local area network used by users, consumers, clients, customers or other entities.

In an embodiment, communications between a management computer and devices in a managed network are facilitated by a network gateway device. A network gateway device may be configured in the managed network, and may be communicatively coupled to the management computer either directly or indirectly. Examples of a network gateway device may include cable modems and routers, DSL modems and routers, or the like.

A network gateway device located in a managed network may provide to a management computer various types of information about devices in the managed network. For example, the gateway may provide information about the identities of devices present in the network, configuration information of the devices, topographical and connectivity information of the network, network utilization by the devices, and other network performance information.

A network gateway device may also be configured to receive instructions from a management computer. A gateway may receive the instructions from a user who directly accesses the gateway in the managed network, or from an operator who accesses a management computer. The instructions may be intended to accomplish a variety of tasks, such as controlling, provisioning and configuring the devices in the managed network. For example, the instructions may pertain to restricting network utilization by one or more devices in the managed network, regulating network utilization by the devices in the managed network during a particular time interval, restricting a certain type of traffic directed to or from the devices in the managed network, or any other network-controlling tasks.

A network gateway device may also be configured to generate and display a graphical user interface (GUI). Using the GUI, the gateway may provide interactive access to devices in the managed network. For example, in the GUI, the gateway may display network utilization information for a user. The network utilization information may comprise statistical data, charts, graphs, warning, error messages, bandwidth utilization data aggregated for each device and for groups of devices, a restriction schedule and other controlling information. Via the GUI, the gateway may also receive user instructions pertaining to the network utilization. Further, the network gateway device may display various statistical data, such as counts of bytes, packets and segments received or sent by each device in the managed network.

In an embodiment, a network gateway device collects and provides device-specific information to a management computer. Device-specific information may pertain to identities of the devices in a managed network and capabilities of the devices. For example, the device-specific information for a particular device may include information about the identity of the particular device, the device type or class information, the device manufacturer information, the device functionality information, the device configuration, the communications protocols implemented on the devices, the identifiers of the ports implemented on the particular device, and the like.

In an embodiment, using device-specific information, a management computer determines one or more software applications configured to generate control instructions for devices in a managed network. For example, for a particular computing device from a plurality of devices in the managed network, using the device-specific information, the management computer may determine a particular software application that is configured to monitor and control network utilization by the particular device.

To determine a particular software application, a management program executed by a management computer may determine a match between the device capabilities, included in the device-specific information of the particular device, and the capabilities of each of network software applications implemented in the management computer. In finding the match, the management program may use the device-specific information and a capabilities mapping.

A capabilities mapping is usually generated by an operator of a management computer when one or more software applications are ported to the management computer. A capabilities mapping comprises descriptions of the capabilities of each network software application implemented in the management computer.

A capabilities mapping is not to be confused with an association mapping. A capabilities mapping, also referred to as a device driver, reflects capabilities and features of software applications implemented in a management computer. A capabilities mapping is usually created and stored by an operator of the management computer when the software applications are ported to the management computer. In contrast, an association mapping for a particular device is created when a management computer already determines a particular software application that is configured to manage the particular device, and determines a particular protocol endpoint that is configured to transmit control instructions to the particular device. An association mapping reflects an association between the particular software application that is configured to generate control instructions for the particular device, the particular protocol endpoint that is configured to transmit control instructions to the particular device, and the particular device.

A capabilities mapping for a particular device is created to determine a software application that has the capabilities to generate control instructions for the particular device. In contrast, an association mapping is created after the capabilities mapping is used to determine a particular software application that has the capabilities to generate control instructions for the particular device. A capabilities mapping is created to determine a software application that has the capabilities to generate control instructions for the particular device, while an association mapping is created to actually facilitate the generating of the control instructions for the particular device and transmitting of the control instructions to the particular device.

A capabilities mapping may be implemented as any data structure such as a data table, a data container, a spreadsheet, or the like. In an embodiment, the capabilities mapping is referred to as a driver, which for purposes of the disclosure herein is distinct and different from other uses of the term device driver in other contexts, such as the operating system context, and the like. If a match between the capabilities is found, then the matching particular software application is deemed to be configured to control the particular device.

A network software application is an application that is configured to manage a device or a group of devices. For example, a bandwidth restricting application may be configured to manage a personal computer that has the capabilities to utilize bandwidth to communicate with other devices. In this example, the bandwidth restricting capabilities of the bandwidth restricting application may be compared with the bandwidth usage capabilities of the personal computer to determine whether a match between the capabilities may be found. Since the bandwidth usage capabilities of the personal computer match the bandwidth restricting capabilities of the bandwidth restricting application, the match is found.

In an embodiment, using device-specific information, a management computer also determines protocol endpoint applications for communicating control instructions to devices in a managed network. For example, for a particular computing device, using the device-specific information of the particular device, the management computer may determine a particular protocol endpoint application that is configured to facilitate communications between the management computer and the particular device.

A protocol endpoint application is an application that is configured to communicate control instructions to a device or a group of devices. For example, a particular protocol endpoint may be an application configured to establish a TCP connection between devices, communicate data segments using the TCP connection, and close the TCP connection between the devices. The TCP protocol endpoint may be configured to communicate the control instructions to a particular device if the particular device has the capabilities to establish a TCP connection, communicate data segments using the TCP connection and close the TCP connection. If the device-specific information for the particular device indicates that the particular device implements TCP, then by comparing the device-specific information for the particular device with the capabilities of the TCP protocol endpoint, the management program may identify the TCP protocol endpoint as the protocol endpoint application suitable for communicating the control instructions from the management computer to the particular device.

In an embodiment, a management computer receives, from a network gateway device, aggregated data that reflects network utilization by each of a plurality of devices located in a managed network. The aggregated data may comprise various counts or metrics of data collected from the devices in the managed network. For example, the aggregated data may comprise any of: a count of bytes sent by the devices, a count of bytes received by the devices, a count of packets sent by the devices, a count of packets received by the devices, a count of segments sent by the devices, a count of segments received by the devices, a count of bytes sent by the devices within a particular time interval, a count of bytes received by the devices within a particular time interval, a count of packets sent the devices within a particular time interval, and a count of packets received by the devices within a particular time interval, and the like.

Aggregating network utilization data may be performed in a variety of ways. For example, the data may be aggregated across multiple users, customers, devices, group of devices, types of devices or type of traffic the devices carry.

Network utilization regulation may be time-based and device specific. For example, a management computer may limit the amount of bandwidth that a particular device in a local area network may use during a particular period of time. According to another example, a management computer may limit the amount of bandwidth that some devices in the local area network may use during one period of time and the amount of bandwidth that other devices in the network may use during another period of time.

The regulation may also be quantity specific. For example, a management computer may limit the aggregate amount of data, such as a total number of bytes, packets or segments that a particular device may transmit to other devices.

The regulation may also be based on the type of protocol that a particular device implements. For example, a management computer may limit or restrict a particular device in terms of the total quantity of HTTP communications sent or received, or the total quantity of VOIP communications sent or received. Further, the management computer may prevent a particular device from using a particular port, sending or receiving traffic in a particular direction (upstream or downstream), exceed a certain traffic frequency, sending a certain type of traffic or receiving a certain type of traffic.

Network Management Environment

FIG. 1 illustrates an example network management environment 100 for remote monitoring and controlling of network utilization in a managed network 105. NME 100 comprises a network management computer 110, communicatively coupled via network 112 with one or more managed networks 105. A managed network 105 may be a local area network 114 and one or more devices 130. Network management computer 110 is communicatively coupled with one or more remote computers 145, one or more users 150 and one or more networks 112.

A management computer 110 may be part of any type of network such as a service provider network, a data content delivery network, or other network providing services to users, consumers or customers. For example, a management computer may be part of an ISP network, part of a CDN or part or any network that provides services to users, consumers or customers. A management computer is configured separately from the managed networks 105.

A managed network 105 is a network remotely managed by a management computer 110. Examples of managed networks include local area networks, residential networks, home networks, customer networks, consumer networks or any other local area networks that are separate from the management computer. In an embodiment, the managed network 105 comprises one or more local area networks 114 and one or more devices 130.

In an embodiment, network management computer 110 remotely manages a managed network 105. Managing the managed network 105 may include controlling the network 105 and devices 130, configuring and reconfiguring the network 105 and the devices 130, and monitoring the activities taking place in the network 105 and the devices 130. For example, network management computer 110 may regulate network utilization of one or more devices 130, restrict network utilization by devices 130, restrict network utilization by devices 130 during a particular time interval, restrict a particular traffic type sent to and received from devices 130, prioritize network utilization by devices 130, or request additional network utilization data from devices 130. In managing the network 105, the management computer 110 cooperates with a gateway device 120, configured in the managed network 105.

A gateway device 120 may be any type of router, modem, or other device that is configured in managed network 105, and that communicatively couples local area network 114 with network 112. The gateway device 120 may be a cable or DSL modem, a router or a similar device that is installed in managed network 105 to facilitate connectivity for devices 130 and devices outside of managed network 105. For example, a gateway device 120 may be a residential gateway configured in a residential network, a customer gateway device configured in a customer network, a consumer gateway configured in a consumer network, or any other type of a gateway configured in managed network 105.

A local area network 114 may be any type of data communications network. Non-limiting examples of local area network 114 include residential networks, home networks, customer networks, corporate networks, entertainment networks, retail networks and other types of local area networks. Local area network 114 may be a wire-based network, a wireless network or a combination of both.

Devices 130 in managed network 105 may be communicatively coupled to local area network 114. Via local area network 114, devices 130 may communicate with gateway device 120, and via gateway device 120, devices 130 may communicate with other networks, such as network 112.

Non-limiting examples of devices 130 include a set-top box 130a (such as a cable box, a satellite receiver, a gaming system), a camera 130b (such as a home video camera, a security camera, a Web camera), a desktop computer 130c, a mobile device 130d (such as a smart phone, a tablet computer, a PDA), and a laptop computer 130e.

Other devices may also be connected to local area network 114. Such devices may include home appliances (such as refrigerators, washing machines, and hot tubs), lighting systems, security systems, digital video recorders, entertainment systems, and the like.

Gateway device 120 and devices 130 may be managed locally or remotely. For example, gateway device 120 may be managed locally by a user who directly accesses gateway device 120 and issues management commands or instructions from gateway device 120 to gateway device 120 and devices 130. This type of managing the gateway and the devices is referred to as "local" because the management commands and instructions are issued by an entity directly accessing the gateway 120.

According to another example, gateway 120 and devices 130 may be managed remotely. In this example, gateway device 120 may receive instructions and requests from users 150a-m, who access network management computer 110 and communicate with management network 105 via network management computer 110 and network 112.

Users 150a-m may be individuals who are provided with access to network management computer 110. For example, a user 150 may be a technician employed by a service provider network company, a system operator, a network manager or other individual allowed to access network management computer 110.

Users 150a-m may have either direct or indirect access to network management computer 110. For example, as depicted in FIG. 1, users 150a-n may access network management computer 110 directly, while user 150m may access network management computer 110 from a management console 140. According to other example (not depicted in FIG. 1), users 150a-m may access network management computer 110 via network 112.

Network management computer 110 may be communicatively coupled to one or more remote computers 145, configured to support network management computer 110. Remote computers 145 may comprise a cloud storage system, various database servers and other processing devices supporting network management computer 110. For example, a remote system 145, implementing a cloud storage system, may provide storage capacity to network management computer 110. The cloud storage system may be used for storing information about types and identities of devices 130 in local area network 114, configurations of devices 130, topographical and connectivity information of local area network 114, and network utilization by devices 130.

In an embodiment, gateway device 120 comprises a management module 122, configured to facilitate management of local area network 114 and devices 130. In an embodiment, a management module 122 is configured facilitate bandwidth monitoring and regulation in managed network 105. For example, in response to instructions or commands received from network management computer 110, management module 122 of gateway device 120 may gather data that reflects network utilization by one or more of devices 130, aggregate the received data, transmit the aggregated data to management computer 110, and determine instructions for regulating network utilization by devices 130 in local area network 114.

A management module 122 may be configured to collect various types of network utilization information from managed network 105. Examples of the types of utilization information may include a count of bytes sent by the devices, a count of bytes received by the devices, a count of packets sent by the devices, a count of packets received by the devices, a count of bytes sent by the devices within a particular time interval, a count of bytes received by the devices within a second time interval, a count of packets sent by the devices within a particular time interval, a count of packets received by the devices within a particular time interval, or any other bandwidth related information. Management module 122 may transmit the network utilization information to management computer 110 for further processing and storing in a cloud storage system. The network utilization information may be accessed by users 150, who may determine control instructions for managed network 105.

Management module 122 may also be configured to receive control instructions intended to control devices 130 in managed network 105. For example, management module 122 may receive control instructions from users 150 and management computer 110. The instructions may pertain to various monitoring and controlling tasks to be performed on or by one or more devices 130. For example, the instructions may comprise a request for additional network utilization data, a request to regulate network utilization of devices 130, a request to restrict network utilization by devices 130, a request to restrict network utilization by one or more devices 130 during a particular time interval, a request to restrict a particular traffic type sent to and received from devices 130, a request to prioritize network utilization by the devices 130, or any other network control related request.

Further, management module 122 may be configured to execute control instructions intended to control devices 130 in managed network 105. For example, management module 122 may cause restricting network utilization by one or more devices 130 in managed network 105, regulating network utilization by devices 130 during a particular time interval, restricting a certain type of traffic directed to or from devices 130, or any other network-monitoring and controlling tasks.

Management module 122 may also be configured to gather device visibility and population information about local area network 114 and devices 130. The gathered information may comprise: device identity information, including address information, such as hardware and network addresses, and network names; device type information, such as a desktop computer type, a camera type, or others; and device manufacturer and brand information, and the like. Management module 122 may then transmit the gathered information to network management computer 110 for further processing and storing. The stored information may be accessed by a user 150a (or "one of users 150"), who may be a customer support operator or a technician. The user 150 may access the stored information either directly at network management computer 110, or via management console 140. For example, a technician 150m may use management console 140 to determine the identities of devices 130 connected to local area network 114.

Management module 122 may also perform other functions and tasks. For example, management module 122 may facilitate content filtering, device configuration backup and restore, network quality of service management, network analytics, wireless network management, firmware upgrades, a system "heartbeat" monitoring, network access redirection, and the like.

Management module 122 may receive control instructions from remote entities, local entities, or both. For example, management module 122 may receive control instructions from users 150, who access network management computer 110 to connect with gateway device 120. According to another example, management module 122 may receive control instructions from the users who may access gateway device 120 directly.

To facilitate local access to functionalities of management module 122, gateway device 120 may provide a control panel or other type of interface that can be used by a local user to configure, control, and otherwise manage managed network 105. The local interface or control panel may be made available via a Web server or an application component executing on gateway device 120.

In an embodiment, NME 100 may be deployed to manage network services provided by a network provider, such as a cable company, a telephone company, ISP, or CDN. When NME 100 is deployed for a network provider, NME 100 may be accessed by customer support representatives of the network provider, help desk assistants, technicians, or the like. They may access and use network management computer 110 to manage multiple distinct local area networks located at customer premises, such as local area network 114 located at customer premise 105. Network management computer 110 may reside in a data center or other facility operated by or for the network provider.

In an embodiment, NME 100 is implemented using Prime Cloud solutions commercially available from Cisco Systems, Inc., San Jose, Calif.

Network Management Extensibility

In an embodiment, network management computer 110 comprises an extension framework that facilitates dynamic configuration, adaptability, and control of third-party devices. For example, network management computer 110 may support extensions, plug-ins, dynamic libraries, adapters, drivers, or similar modules, by which network management computer 110 may be configured to meet customer needs, market demands, emerging technologies, alternative protocols, or the like.

In an embodiment, network management computer 110 comprises an interface for one or more plug-ins. The plug-ins may be configured to perform or provide various classes of functionality and communicate according to a variety of different communications protocols. For example, network management computer 110 may comprise plug-ins configured to manage customer subscriptions, creating and displaying a user interface for administrators, creating and displaying a consumer portal for subscribers; manage workflows, provide Web Services, such as facilitating interactions between plug-ins and other modules.

Implementation Examples

Figure 2:
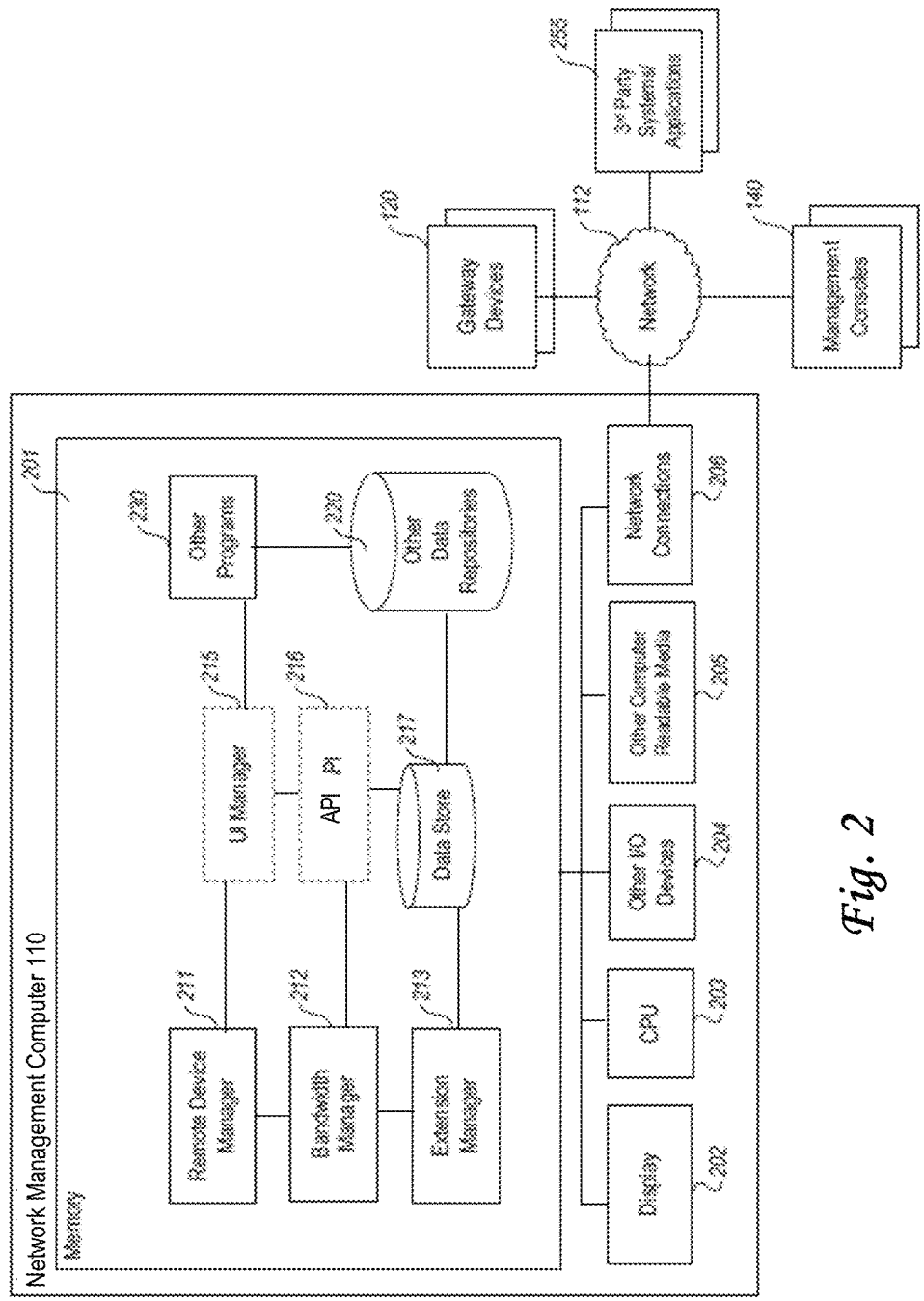
FIG. 2 illustrates an example network management computer for remote monitoring and controlling of network utilization in a computer network.

FIG. 2 illustrates an example network management computer 110 for remote monitoring and controlling of network utilization in a computer network. In an embodiment, a network management computer 110 may be implemented in software, hardware, firmware, or in some combination to achieve the capabilities described herein.

In an embodiment, network management computer 110 comprises a computer memory 201, a display 202, one or more Central Processing Units ("CPU") 203, other input/output devices 204 (such as a keyboard, mouse, CRT or LCD display, and the like), other computer-readable media 205, and network connections 206.

In an embodiment, components of network management computer 110 are implemented as an executable program, running on CPU 203, and accessing one or more static or dynamic libraries. According to another example, network management computer 110 may be implemented as code instructions, processed by a virtual machine that executes as one of other programs 230.

In an embodiment, code instructions of network management computer 110 may be transmitted over other computer-readable media 205, stored in memory 201, and executed on one or more CPUs 203. Other code or programs 230 (such as an administrative interface, a Web server, and the like) and potentially other data repositories, such as data repository 220, may also reside in memory 201, and execute on one or more CPUs 203.

Some of the components depicted in FIG. 2 may not be present in specific implementations. For example, some embodiments may not include other computer readable media 205 or a display 202.

Network management computer 110 may interact with network 112, one or more gateway devices 120, management consoles 140, and third-party systems and applications 255.

Network 112 may be any combination of communications media (such as a twisted pair, coaxial, fiber optic, radio frequency), hardware (such as routers, switches, repeaters, transceivers), and protocols (such as TCP/IP, UDP, Ethernet, Wi-Fi, WiMAX). Network 112 may facilitate communications between remotely situated individuals (system operators, customer service technicians or users) and devices communicatively coupled to gateway device 120.

Third-party systems and applications 255 may include back-end customer management systems used by carriers or other network providers, legacy network control and configuration systems, and the like.

In an embodiment, network management computer 110 comprises a remote device manager 211, a bandwidth manager 212, an extension manager 213, a user interface manager 215, a network management computer application program interface ("API") 216, and a data store 217. In FIG. 2, the user interface manager 215 and the API 216 are drawn using dashed lines to indicate that, in some embodiments, functions performed by one or more of these components may be performed by devices located externally with respect to network management computer 110.

A remote device manager 211 may be configured to interact with gateway device 120. For example, remote device manager 211 may receive device visibility information from gateway device 120, and store the received information in a data store 217. For example, a remote device manager 211 may be configured to receive, from a network gateway device in a managed network, device-specific information for each of a plurality of devices located in the managed network behind the gateway device. The device-specific information for a particular device may include information about the identity of the particular device, the device type or class information, the manufacturer information, the device functionality information, the device configuration, the communications protocols implemented on the particular devices, the identifiers of the ports implemented on the particular device, and the like.

Using device-specific information for a particular device, remote device manager 211 may determine a particular software application that is configured to monitor and control network utilization by the particular device. To determine a particular software application, remote device manager 211 may use the device-specific information, received from a gateway, and a capabilities mapping, previously created and stored by the remote device manager 211, to determine a match between the device capabilities of the particular device and the capabilities of a particular network software application. If a match is found, then the matching particular software application is deemed to be configured to control the particular device. For example, a bandwidth restricting application, executed by a bandwidth manager 212 (described below) may be configured to manage a personal computer that has the capabilities to communicate with other devices. If a particular device has the capabilities to communicate with other devices, then a match between the capabilities of the bandwidth restricting application and the capabilities of the particular device may be found.

Using device-specific information for a particular device, remote device manager 211 may also determine a particular protocol endpoint that is configured to communicate control instructions to the particular device. To determine a particular protocol endpoint, remote device manager 211 may try to for example, determine the communications protocol that the particular device implements and determine one or more protocol endpoint applications configured to handle communications using the protocols that the particular device implements. If a particular protocol endpoint application capable of communicating with the particular device is found, then the particular endpoint application is deemed to be configured to communicate control instructions from the management computer to the particular device. For example, a TCP protocol endpoint application, executed by a network connections module 206, may be configured to communicate the control instructions from the management computer to the particular device, such as a personal computer, if the particular device implements TCP. According to another example, a protocol endpoint application implementing IEEE 802.11, branded as Wi-Fi, executed by a network connection module 206, may be configured to communicate control instructions from the management computer to the particular device, such as a smart phone, if the particular device implements IEEE 802.11.

Remote device manager 211 may also send commands to control the operation of gateway device 120. Information received and generated by remote device manager 212 may be stored in data store 217.

A bandwidth manager 212 may be configured to monitor bandwidth parameters within network 112 and regulate network utilization within network 112 and third-party devices connected to network 112. For example, bandwidth manager 212 may instruct gateway device 120 to initiate monitoring of the network utilization, collect and aggregate the network utilization data, generate statistical data based on the aggregated data, and generate control instructions to regulate network utilization within network 112 and third-party devices connected to network 112.

In an embodiment, bandwidth manager 212 may receive network utilization information from gateway device 120. The utilization information may include various counts and metrics, indicating network utilization and bandwidth related information. Bandwidth manager 212 may transmit the network utilization information to a cloud storage system, configured on a remote computer, such as a remote computer 145, depicted in FIG. 1.

Bandwidth manager 212 may also be configured to generate (or receive) control instructions intended to control devices connected to local area network 112. The instructions may pertain to various monitoring and controlling tasks to be performed on or by one or more devices connected to network 112. For example, the instructions may pertain to requesting additional network utilization data, regulating network utilization in network 112, restricting network utilization in network 112, restrict network utilization during a particular time interval, restricting a particular traffic type sent to and received to network 112, prioritizing network utilization by devices connected to network 112, or any other network control related tasks.

An extension manager 213 may be configured to manage various extension applications, such as plug-ins, drivers and dynamic libraries, configured to extend the operation of network management computer 110. Extension manager 213 may manage the extension applications to provide flexibly in configuring network management computer 110 to adapt network management computer 110 to different deployment scenarios and needs, changing conditions, or the like. For example, upon connecting a new device to a gateway device 120, extension manager 213 may cooperate with an extension application, implemented in extension manager 213 and compatible with the new device, to enable network management computer 110 to communicate with the new device.

An UI manager 215 may be configured to generate and display a user interface, and to facilitate user interaction with network management computer 110 and its various components. For example, UI manager 215 may provide interactive access to network management computer 110, such that users and customer support representatives may interact with and manage devices connected to gateway device 120. In an embodiment, access to the functionality of UI manager 215 may be provided via a Web server, possibly executing as one of the other programs 230. In such embodiments, a user operating a Web browser executing on one of management consoles 140 may interact with network management computer 110 via UI manager 215.

An API 216 may be configured to provide programmable access to one or more functions of network management computer 110. For example, API 216 may provide a computer-generated user interface to enable access to one or more functions of network management computer 110. The API 216 may also provide support to other programs 230 or some other units. Furthermore, API 216 may facilitate the development of third-party software applications, such as user interfaces, plug-ins, news feeds, adapters for integrating functions of network management computer 110 into Web applications, and the like.

In an embodiment, API 216 may be invoked or otherwise accessed via remote entities. Accessing various functions of network management computer 110 may be enabled by accessing a management console 140 or via one of the third-party systems/applications 255. For example, using a customer relationship management system (as one of the third-party systems 255), a user may send customer information, such as customer names, addresses, and account information, to network management computer 110 via API 216.

In an embodiment, API 216 may be configured to provide management widgets, such as code modules, configured to allow third-party applications 255 to interact with network management computer 110. By allowing third-party application 255 to interact with network management computer 110, functionalities of network management computer 110 may be made available to a variety of other applications, such as mobile applications.

A data store 217 may be configured to store data and provide access to the stored data. Data store 217 may be used by various modules of network management computer 110 to store and/or communicate information. For example, components 211-216 of network management computer 110 may use data store 217 to record various types of information, such as network utilization information, device identity information, and the like.

In an embodiment, components 211-216 communicate with each other primarily through data store 217. In another embodiment, components 211-216 communicate with each other directly, bypassing data store 217, and using various communications mechanisms, such as messaging, function calls, pipeline communications, socket communications, shared memory access, and the like.

A data store 217 may be implemented as one or more database systems, file systems, or any other technique for storing such information, or any combination of the above, including implementations using distributed computing techniques.

Remote Monitoring and Managing of Network Utilization by a Management Process

Figure 3:
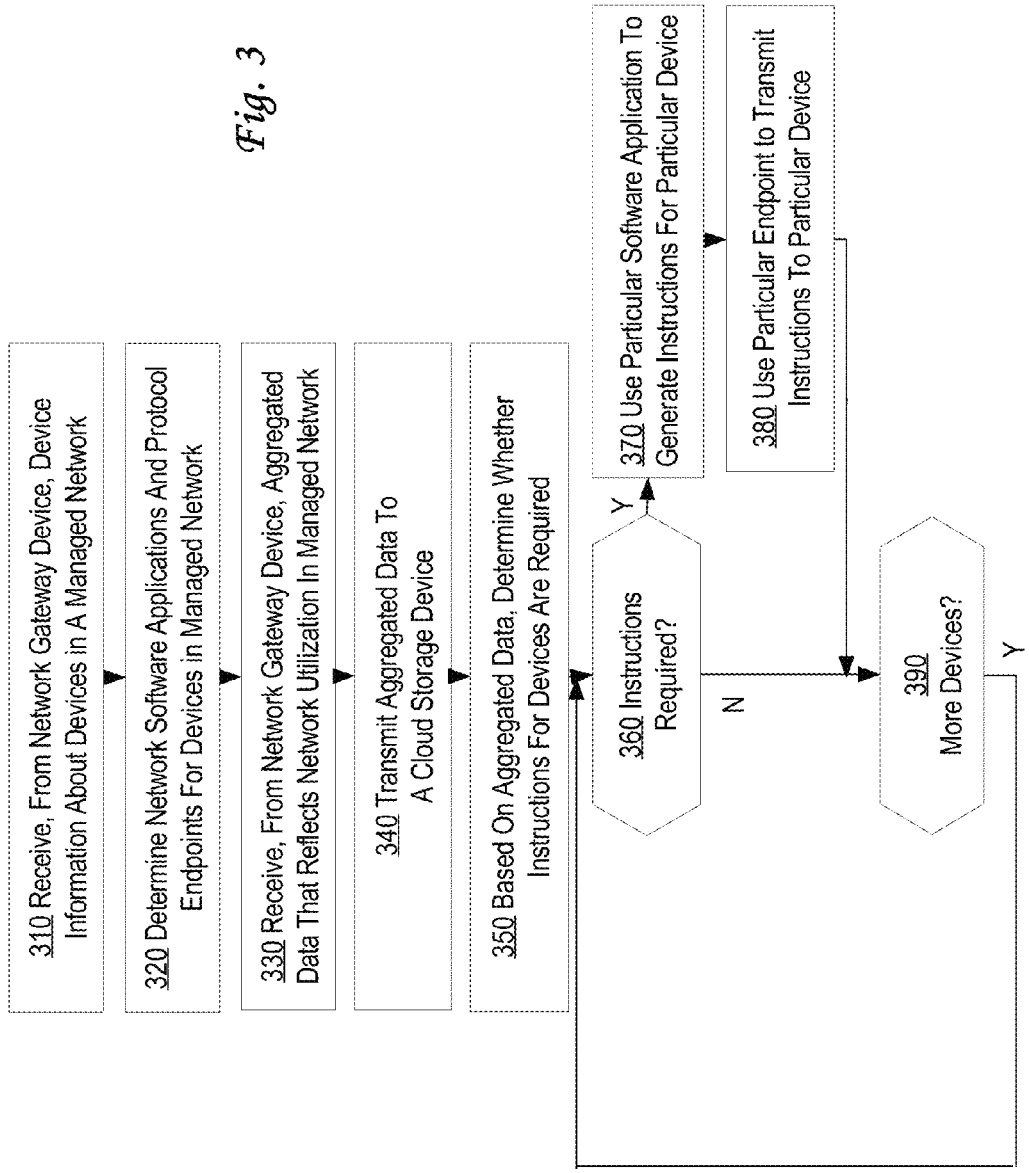
FIG. 3 illustrates an example method for remote monitoring and controlling of network utilization in a computer network.

FIG. 3 illustrates an example method for remote monitoring and controlling of network utilization in a computer network. In an embodiment, the remote monitoring and controlling of devices in the managed network allows managing a variety of heterogeneous devices in a local area network by using network software applications configured to generate control instructions for the devices, and communicating the control instructions to the devices using communications protocols that the devices implement.

In an embodiment, a remote managing of a particular device may be performed by a management program that invokes a particular software application that is configured to generate control instructions for the particular devices. Further, the management program invokes a particular protocol endpoint that is configured to communicate the control instructions to the particular device using the communications protocol that the particular device understands. The particular software application need not be aware of the protocol types or the interface types implemented in the particular device in the managed network, and need not be configured to interact with the device directly. Instead, once the particular software application derives the control instructions for the particular device, the particular software application may rely on the particular protocol endpoint to communicate the control instructions to the particular device and to receive responses from the device. Hence, in managing the particular device, the management program cooperates with the particular software application and the particular protocol endpoint, and managing of the plurality of devices involves determining the particular software application and the particular protocol endpoint for each device from the plurality of devices.

In an embodiment, implementation of the remote monitoring and managing of a managed network does not involve modifications to a management program each time a new device is added to the managed network. Even if a new device is incompatible with other devices in the managed network, modifications of the management application may be avoided. For example, any communications compatibility issues may be resolved at a protocol endpoint's level by developing a particular protocol endpoint application to handle the communications with the new device, and integrating the particular protocol endpoint with the management application.

A management program may be configured to perform a variety of tasks. For example, a management program may be configured to request assigning a priority scheme to devices in a local area network. By assigning the priorities to the devices, the management computer may give preferential treatment to some devices in terms of network utilization. For example, when a user of a particular device tries to establish a VoIP communication with another device, the management computer may assign a relatively high priority to the particular device and enable the particular device to deliver a VoIP signal that satisfies a certain level of quality of service.

In step 310, a process executed by a management computer, receives, from a network gateway device, device information about the device capabilities of the devices in a managed network.

Device information may be collected by a management program in cooperation with a gateway, such as gateway 120 depicted in FIG. 1. The management program may be configured to send a request to the gateway instructing the gateway to collect the device information and to transmit the device information to the management program. Alternatively, the device information may be collected by the management program after the device information is received from the individual devices, from the gateways, or both.

A gateway may request device information from a device upon receiving a request from a user accessing a network management computer, from a user accessing the gateway, or from a program, process or system operating automatically. Alternatively, the gateway may receive the device information from a device without actually receiving any request for the data. That may occur when the device is programmed to periodically provide its own status information and configuration data to the gateway even if the gateway does not specifically request such information.

In step 320, the process determines network software applications and protocol endpoints for devices in the managed network. Determining the network software applications and the protocol endpoints for the devices may be performed using a variety of approaches. According to one approach, for each of the computing devices, one or more matches between the device capabilities for a particular device and capabilities of one or more network software applications are determined. In this step, for each device, a description of the device capabilities is compared with a description of the capabilities of the network software applications until one or more matches are found.

A network software application is a management application configured to monitor, control and manage the devices in the local area network. For example, a network software application may be an application configured to restrict bandwidth that a particular device may use within a particular time period. When invoked, the bandwidth restricting application may generate control instructions for the particular device to cause limiting of the bandwidth that the particular device may use within the particular time period.

A match between device capabilities of a particular device and features of network software applications may be determined in a variety of ways. For example, a match may be found using a text-comparison between a description of the capabilities of a device and a description of the features of each of the network applications. A description of the capabilities of a device may be provided by the device or a gateway communicating with the devices. A description of the features of the network applications may be generated by an operator of a management computer, and stored in various data structures, such as tables, spreadsheets, lists, text files or any other structure configured to store data.

Finding a match may be performed in a couple of steps. In the first step, upon receiving device information about the capabilities of a particular device, a network management computer may retrieve a data structure comprising descriptions of the capabilities and features of network applications implemented in the management computer. Using various text-comparison-techniques, the network management computer may compare the received device information of the capabilities of the particular device with the descriptions of the capabilities of the network applications. Once a match between the capabilities is found, in the second step, the network management computer may use the table again to identify the particular network application whose capabilities match the capabilities of the particular device. Based on the match, the identified particular application is most likely configured with the capabilities and features for managing the particular device.

A comparison between a description of a particular device capabilities and a description of the device capabilities in a table may be performed using various methods for comparing texts, strings and other types of data. For example, in the bandwidth restriction example described above, if a particular device has the capabilities to download contents from servers, then a description of the content downloading capabilities of the particular device may be compared with the description of a bandwidth restricting application. In particular, finding a match between the description of the content downloading capabilities of the particular device and the description of the bandwidth restricting application may be performed by comparing the text of the description of the content downloading capabilities of the particular device with the description of the bandwidth restricting application until a match between the capabilities is found. Once a match between the capabilities is found, the network management computer may use the description again to identify the particular application that has the matching capabilities. The identified particular application is most likely configured with the capabilities for managing the content downloading capabilities of the particular device.

In an embodiment, a description of the capabilities and features of a network software application is referred to as a device driver; the meaning of the term device driver for purposes of the disclosure herein is distinct and different from other uses of the term device driver in other contexts, such as the operating system context in which a device driver might be a set of instructions for controlling computer hardware peripherals or I/O devices.

In the context of this disclosure, a device driver may be implemented in a database server or any other data storage device, and may comprise data representing a description of the capabilities and features of the network software applications. For example, a device driver may be a data table that has one row for each of the network software applications supported by a network management computer, wherein a row for a particular network software application may comprise a description of the features of the particular network software application, and, optionally, an identifier of the particular network software application. Other implementations of the device drivers may include pointers to various data structures, relational databases or other data structures.

In an embodiment, based on the match, a particular network software application is selected from one or more network software applications. As described above, once a match between the capabilities of the particular devices and the capabilities of various devices is found, a particular software application, configured with the features for managing the capabilities of the particular device is identified and selected. The selection of the particular network software application may be accomplished using the particular match and a device driver (described above), a list, a spreadsheet or other data structure providing the correspondence between the features and the particular network software application.

In an embodiment, based at least in part on the device information for the particular device, a particular protocol endpoint is determined from one or more protocol endpoints. A particular protocol endpoint may be a software application configured to communicate control instructions form the particular software application to the particular device.

A protocol endpoint application may be configured to encapsulate high level messages comprising instructions and commands, into low level communications units, such as packets or segments. For example, a protocol endpoint application may be an application configured to use TCP/IP packets to encapsulate HTTP instructions, sending the encapsulated instructions to a wireless device for data, and receiving data from the wireless device.

In an embodiment, for each device managed by a management computer, the management computer generates an association mapping, representing an association between a particular network software application, a particular protocol endpoint and the particular device.

An association mapping (or mapping) for a particular network device reflects an association between a particular network software application, configured with the features for monitoring and managing the particular device, a particular protocol endpoint for communicating with the particular device, and the particular device. For example, if a particular computing device is a game station, and the particular game station has the capabilities to download and play video games, then a network management computer may create and store an association mapping between a particular game-distribution application, a particular protocol endpoint configured to deliver games to the particular wireless device, and some type of identifier of the particular wireless device. The particular game-distribution application may be configured to receive requests and to download the games. The particular protocol endpoint may be configured to send requests from the game station to the particular game-distribution application, and send game contents from the particular game-distribution application (or a website or other sources) to the game station. The association mapping may be stored in a data center, cloud data storage or any other storage facility. The association mapping may be retrieved each time a user of the wireless device requests downloading a video game, and each time the network management computer downloads a video game to the wireless device.

An entry in an association mapping represents a correlation between a particular network software application, a particular protocol endpoint and a particular computing device. For a particular device, a network management computer may create and store one or more entries in an association mapping. For example, for a personal computer, having the capabilities to communication using VoIP and the capabilities to receive software upgrades, the mapping may comprise at least two entries: the first entry may represent an association between a VoIP supporting application, a VoIP protocol endpoint application, and the particular personal computer identifier. The second entry may represent an association between a software upgrade handling application, a TCP protocol endpoint for communicating the upgrades to the particular personal computer and the particular personal computer identifier. The first entry in the mapping may indicate that the VoIP supporting application may manage VoIP communications for the particular personal computer, and that the VoIP protocol endpoint application may communicate control instructions to the particular personal computer. The second entry in the mapping may indicate that the software upgrade handling application may manage software upgrades for the particular personal computer, and that the TCP protocol endpoint application may communicate software upgrades to the particular personal computer.

The same network software application may be used by more than one device and may be associated with more than one protocol endpoints. Moreover, the same protocol endpoint application may be used by more than one device and may be associated with more than one network software application. For example, if a particular device is configured to accept control instructions from more than one network software application and using a particular protocol endpoint, then more than one entry may be created in an association mapping for the particular device. If a particular device is configured to accept control instructions from a particular network software application using more than one protocol endpoints, then more than one entry may be created in an association mapping for the particular device.

A network management computer may maintain a separate association mapping for each individual device managed by the network management computer. Alternatively, the network management computer may maintain one association mapping for each group of the devices, or one association mapping for each user or each local area network. In other implementations, the network management computer may maintain one association mapping for all devices managed by the network management computer. The association mapping(s) may be stored in various data structures and on various storage devices, including distributed databases, cloud systems, and other types of servers.

In step 330, a process executed by a management computer, receives, from a network gateway device located in a managed network, aggregated data that reflects network utilization by each of a plurality of devices located in the managed network. The aggregated data may be generated, by the network gateway device, by aggregating data received by the network gateway device from each of a plurality of devices located in the managed network. The aggregated data may comprise any of: a count of bytes sent by the devices, a count of bytes received by the devices, a count of packets sent by the devices, a count of packets received by the devices, a count of segments sent by the devices, a count of segments received by the devices, a count of bytes sent by the devices within a particular time interval, a count of bytes received by the devices within a particular time interval, a count of packets sent the devices within a particular time interval, and a count of packets received by the devices within a particular time interval, and the like.

In step 340, the process transmits the aggregated data to a cloud storage device for processing, storing any presenting. A cloud storage device may be part of a cloud storage system, and may provide storage capacity to a network management computer. The cloud storage system may be used for storing information about the types and identities of devices in the managed network, configurations of the devices, topographical and connectivity information for the devices, and aggregate network utilization by the devices. Various examples of aggregated data were described above.

In step 350, based at least in part on the aggregated data, the process determines whether any control instructions for one or more devices from the plurality of devices may be generated. For example, if a particular device appears to throttle communications within a managed network, then the process may determine that traffic generated by the particular device needs to be restricted. The traffic may be restricted with a particular time period, or periodically within various time periods. Further, the traffic restriction may pertain to a particular type of traffic, more than one types of traffic, or all traffic generated by (or received by) the particular device. Further, the process may determine that traffic generated by a group of devices needs to be prioritized and a certain scheme of priorities may be assigned to the devices.

If in step 360, it is determined that some control instructions for a particular device in the managed network may be generated, then the process proceeds to step 370. Otherwise, the process proceeds to step 390, in which the process determines whether any control instructions may be determined for other devices in the managed network, and if so, steps 360-390 are repeated.

In step 370, the process uses a previously generated association mapping to determine a particular software application to generate control instructions for a particular device. An association mapping was described in detail above.

In an embodiment, if the process determined that a particular bandwidth restricting application is configured to generate one or more control instructions for a particular device to restrict the bandwidth usage by the particular device during a particular period of time, then the process may use the particular bandwidth restricting application to generate the control instructions for the particular device.

The instructions may comprise a request to prioritize network utilization by each of the plurality of devices in the managed network, a request to restrict a particular traffic type sent to and received from a device of the plurality of devices, a request to regulate network utilization of a device of the plurality of devices within a particular time interval, or any other network utilization related request.

In step 380, the process uses a previously generated association mapping to determine a particular endpoint to communicate the control instructions to the particular device. An association mapping was described in detail above.

In an embodiment, if the process determined that a particular device implements TCP, and the process determined that a particular TCP protocol endpoint application is configured to communicate with the particular devices, then the control instructions intended to the particular device may be communicated to the particular device using the particular TCP protocol endpoint.

In an embodiment, the process may determine that two or more different control instructions may be generated for a particular device. For example, for a personal computer, having the capabilities to communication using VoIP and the capabilities to receive software upgrades, the process may determine that two types of instructions may be generated. In particular, the process may determine that a particular VoIP supporting application may generate instructions to maintain a certain level of quality of service for the VoIP communications, and use a particular VoIP protocol endpoint application to communicate the VoIP-related control instructions to the particular personal computer. Also, the process may determine that a particular software upgrade handling application may generate a software upgrade package for the particular personal computer, and user a particular TCP protocol endpoint for communicating the upgrades to the particular personal computer.

Executing Remote Management Instructions at a Local Area Network

Figure 4:
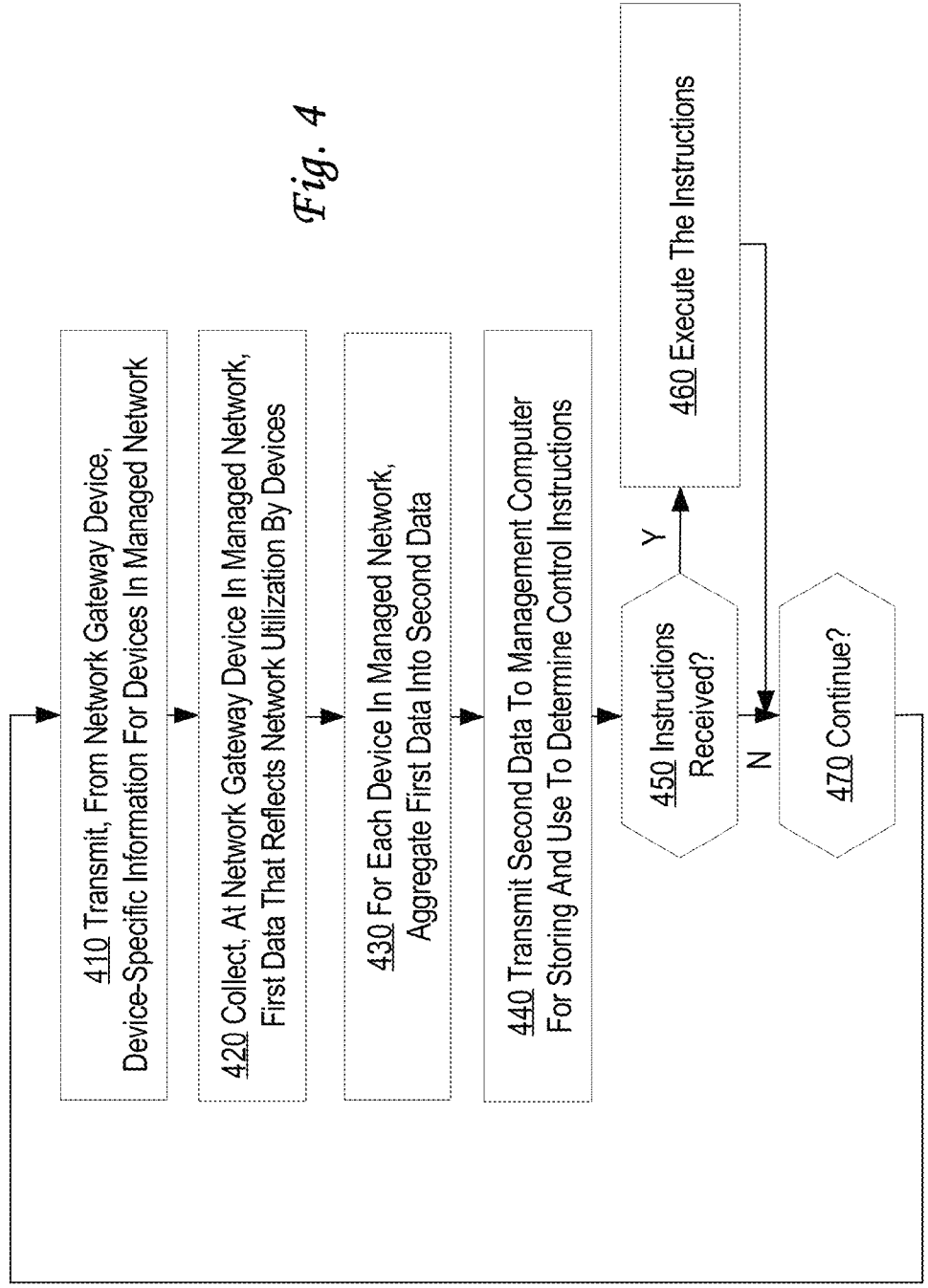
FIG. 4 illustrates an example method for remote monitoring and controlling of network utilization in a computer network.

FIG. 4 illustrates an example method for remote monitoring and controlling network utilization in a computer network. In step 410, a process executed at a network gateway in a managed network transmits device-specific information about devices in a plurality of devices in the managed network to a management computer. Examples of the device-specific information were provided above. The device-specific information may be used by the management computer to determine, for each device in the plurality of devices, a particular software application and a particular protocol endpoint. As described above, a particular software application for a particular device is an application that has the capabilities to monitor, manage and control the particular device, and generate control instructions for the particular device. A particular protocol endpoint for the particular device is an application that is configured to communicate the control instructions to the particular device. Using the device-specific information for a particular device and the identified particular software application(s) and the identified protocol endpoint(s), the management computer may create an association mapping between the particular software application, the particular protocol endpoint and the particular device. The association mapping was described in detail above.

In step 420, a process, executed by a network gateway device in a managed network, collects first data that reflects network utilization by each of a plurality of devices located in the managed network behind the gateway device. Examples of collected data were provided above.

Collecting data may involve collecting network utilization information from individual devices upon receiving a request for the network utilization data. Alternatively, the data may be collected by individual devices even if the network utilization data is not requested. In this situation, the individual devices may collect the network utilization data periodically and according to a certain schedule and upload the collected data to a network gateway.

The process may also sample network transmissions performed by each of the plurality of devices to estimate a number of transmissions during a particular time interval.

In step 430, for each device of the plurality of devices, a process, aggregates the first data into second data that represents aggregated network utilization information for the managed network.

Aggregating network utilization data may be performed in a variety of ways. For example, the data may be aggregated across multiple users, customers, devices, group of devices, types of devices or type of traffic the devices carry. Examples of data aggregation were provided above.

In step 440, the second data is transmitted to a management computer for storing and to determine control instructions for devices in a managed network. For example, the second data may be sent to the management computer for storing in a cloud system, which may be managed and maintained within another network. Further, the second data may be used by the management computer to determine whether any control instructions may be generated to regulate bandwidth utilization by the devices in the managed network. For example, if the second data indicates that a particular wireless device in the managed network has been unsuccessfully trying to connect to a wireless network, then the management computer may determine that network access requests from the devices should be prioritized in such a way that the particular device has a chance to connect to the network.

In step 450, the process checks whether any control instructions has been received from the management computer. Examples of various control instructions have been provided above.

If the control instructions have been received from the management computer, then the process proceeds to step 460. Otherwise, the process proceeds to step 470, in which it tests whether to continue the remote monitoring and management of the network utilization in the managed network. If so, the process proceeds to step 410 and steps 410-460 are repeated.

In step 460, the process executes the received control instructions. The instructions may be intended to one particular device in a managed network, to a group of devices in the network, or to all devices in the network. For example, the process may receive the control instructions for restricting network utilization by a particular device within a particular time period, and the control instructions for restricting network utilization by another device within another time period.

According to another example, the control instructions may comprise a request to prioritize network utilization by each of the plurality of devices. In response to receiving such a request, the network gateway device assigns a network utilization priority level to each of the plurality of devices, and restricts the network utilization of each of the plurality of devices based on the assigned network utilization priority levels.

In an embodiment, the disclosed approach addresses some of the problems identified in the background section above. For example, according to the presented approach, a particular device in a managed network may be monitored and controlled by a remote management program that needs not interface with the particular device directly. Instead, the management program may use a particular software application to determine control instructions for the particular device, and may use a particular protocol endpoint to communicate the control instructions to the particular device. Further, enhancing or extending the network management features of the management computer may be accomplished by developing a network management extension, which does not need to be configured to directly communicate with the customer devices. The communications aspects of the network management may be handled by different applications, such as protocol endpoint applications.

In an embodiment, the presented approach allows communicating control instructions transparently to owners of the managed networks. A protocol endpoint, selected from an association mapping for a particular device, may encapsulate the control instructions, generated by a protocol endpoint, communicate the encapsulated control instructions to the particular device, and cause decapsulation and execution of the instructions. The decapsulated instructions may be executed transparently to a user of the particular device and without the user's involvement. The managing of the networks comprising any quantity and variety of heterogenic devices may be performed transparently to the network owners.

The techniques herein are applicable to other architectures or in other settings. For example, instead of managing residential local area networks, the techniques may be instead or also used to manage networks in corporate settings or data centers. Also, techniques are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
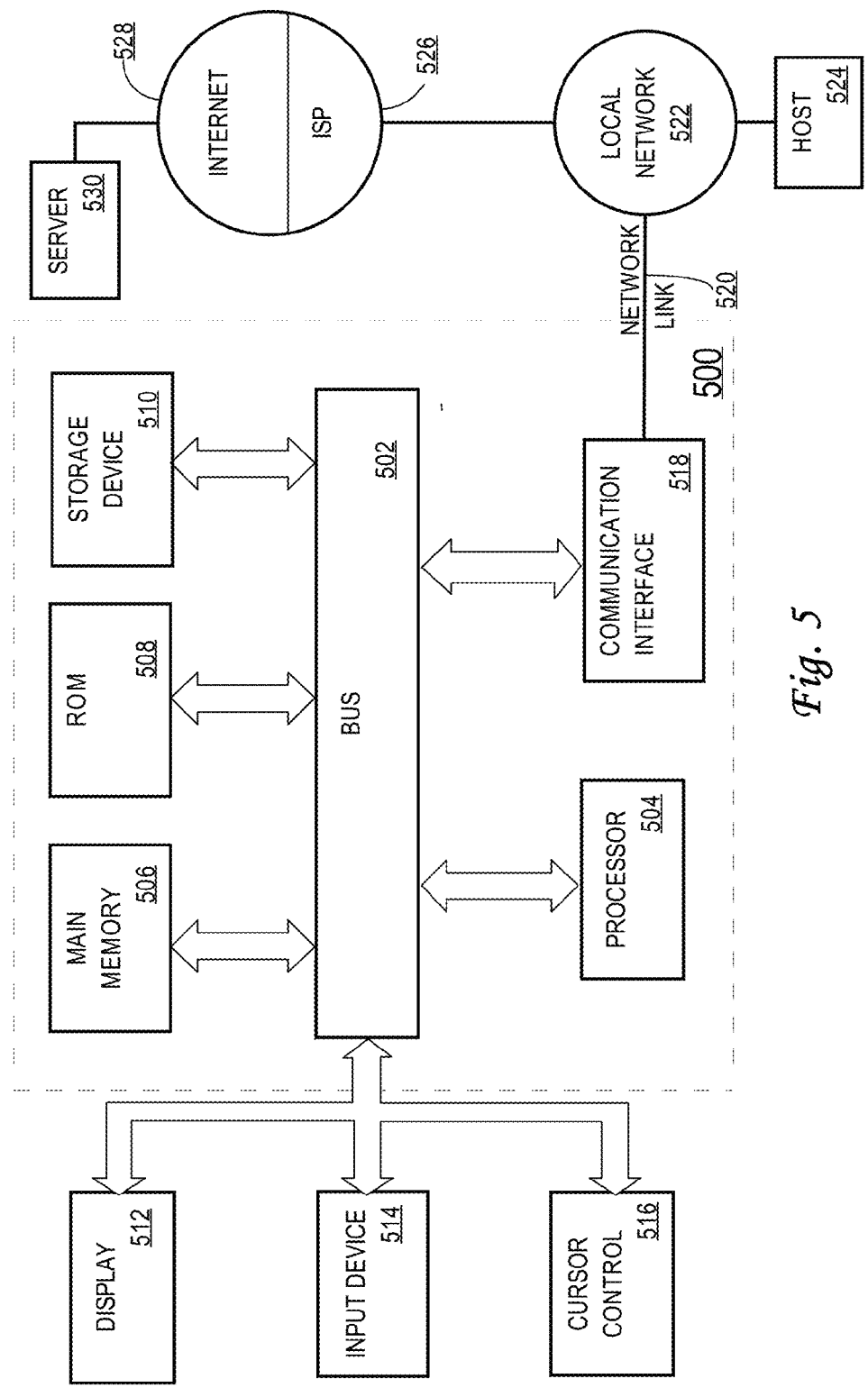
FIG. 5 illustrates an example computer system with which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer-readable storage medium storing one or more instructions which, when executed by one or more processors, cause the one or more processors to perform:
   at a management computer, receiving, from a network gateway device located in a managed network, device information about each of a plurality of computing devices in the managed network;
   for a particular computing device from the plurality of computing devices: determining a particular protocol endpoint configured to communicate control instructions from a particular network software application to a particular computing device;
   receiving data from each of a plurality of devices located in the managed network;
   for the particular computing device:
      based at least in part on the data, using the particular network software application, determining control instructions for the particular computing device;
      causing the particular protocol endpoint to transmit the control instructions for the particular computing device to the network gateway device;
   wherein the management computer is located separately with respect to the managed network.

2. The non-transitory computer-readable storage medium of claim 1, wherein the control instructions comprise a request to prioritize network utilization by the particular computing device in the managed network.

3. The non-transitory computer-readable storage medium of claim 1, wherein the control instructions comprise a request to restrict a particular traffic type sent to and received from the particular computing device.

4. The non-transitory computer-readable storage medium of claim 1, wherein the control instructions comprise a request to regulate network utilization of the particular computing device within a particular time interval.

5. The non-transitory computer-readable storage medium of claim 1, wherein the control instructions comprise a request to restrict a particular traffic type sent to and received from a particular computing device.

6. The non-transitory computer-readable storage medium of claim 1, wherein the plurality of devices comprises one or more of: a set-top box, a digital video recorder, a video camera, a smart phone, a tablet computer, a game console, a home automation system.

7. The non-transitory computer-readable storage medium of claim 1, further comprising instructions which, when executed, cause sampling network transmissions performed by each of the plurality of devices to estimate a number of transmissions during a particular time interval.

8. The non-transitory computer-readable storage medium of claim 1, wherein the data was aggregated across multiple customers.

9. The non-transitory computer-readable storage medium of claim 1, further comprising instructions which, when executed, cause receiving and displaying information specific to network utilization of each of the plurality of devices, and reflecting bandwidth utilization by the plurality of devices.

10. The non-transitory computer-readable storage medium of claim 1, wherein the data is received from the network gateway device and reflects network utilization by each of a plurality of devices located in the managed network.

11. A method for managing and configuring computer network devices in communications networks, the method comprising:
   at a management computer, receiving, from a network gateway device located in a managed network, device information about each of a plurality of computing devices in the managed network;
   for a particular computing device from the plurality of computing devices: determining a particular protocol endpoint configured to communicate control instructions from a particular network software application to a particular computing device;
   receiving data from each of a plurality of devices located in the managed network;
   for the particular computing device:
      based at least in part on the data, using the particular network software application, determining control instructions for the particular computing device;
      causing the particular protocol endpoint to transmit the control instructions for the particular computing device to the network gateway device;
   wherein the management computer is located separately with respect to the managed network;
   wherein the method is performed by one or more computing devices.

12. The method of claim 11, further comprising:
   the management computer receiving a request to prioritize network utilization by the particular computing device in the managed network.

13. The method of claim 11, further comprising:
   the management computer receiving a request to restrict a particular traffic type sent to and received from the particular computing device.

14. The method of claim 11, further comprising:
   the management computer receiving a request to regulate network utilization of the particular computing device within a particular time interval.

15. The method of claim 11, further comprising:
   the management computer receiving a request to restrict a particular traffic type sent to and received from a particular computing device.

16. The method of claim 11, wherein the plurality of devices comprises one or more of: a set-top box, a digital video recorder, a video camera, a smart phone, a tablet computer, a game console, a home automation system.

17. The method of claim 11, further comprising:
   sampling network transmissions performed by each of the plurality of devices to estimate a number of transmissions during a particular time interval.

18. The method of claim 11, wherein the data was aggregated across multiple customers.

19. The method of claim 11, further comprising:
   receiving and displaying information specific to network utilization of each of the plurality of devices, and reflecting bandwidth utilization by the plurality of devices.

20. The method of claim 11, wherein the data is received from the network gateway device and reflects network utilization by each of a plurality of devices located in the managed network.

* * * * *